Aug. 19, 1941.   J. E. GRUDEN   2,252,805
CARRIER CONTROLLED EXHIBITOR
Filed Feb. 24, 1939   6 Sheets-Sheet 2

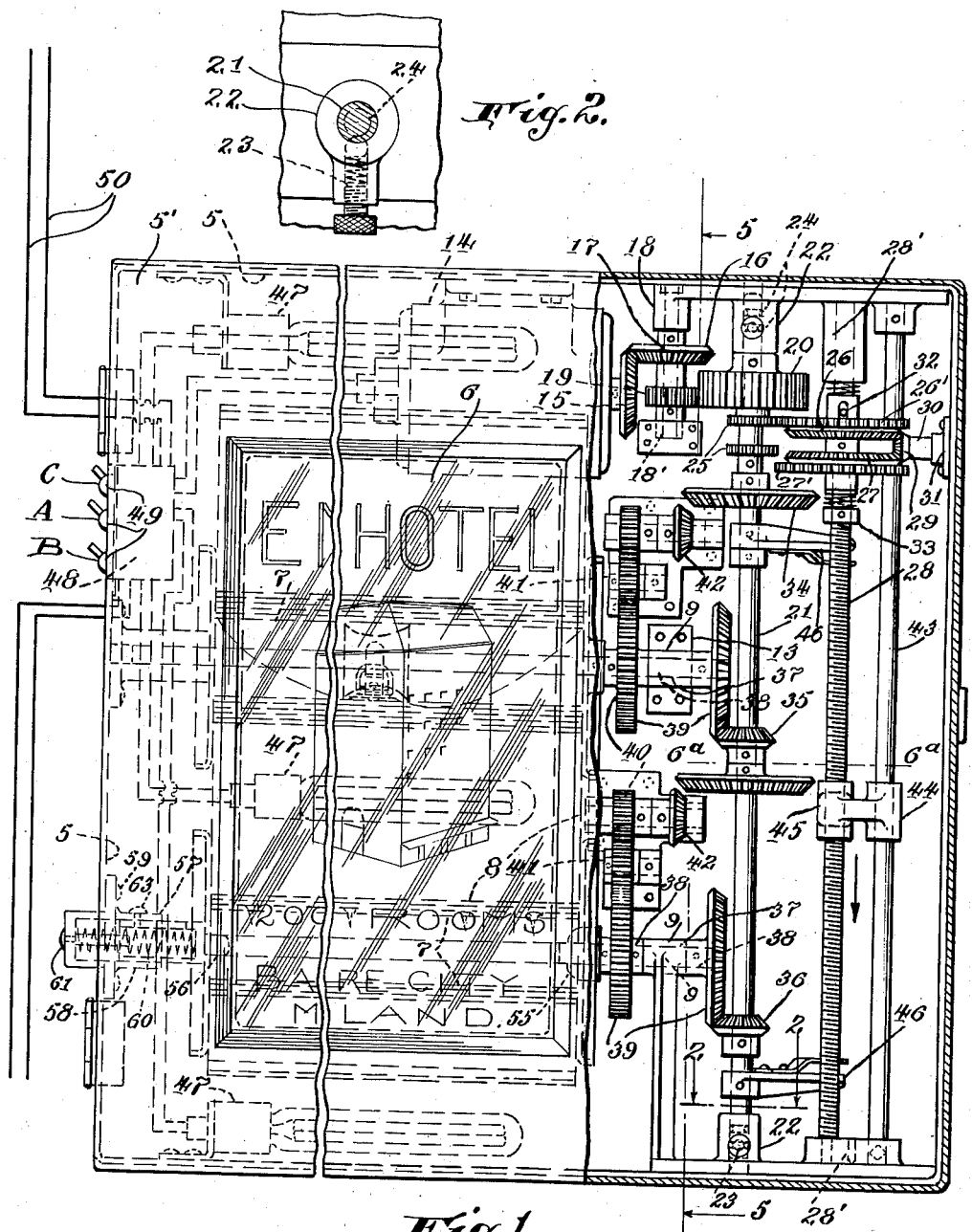

Jack Edward Gruden INVENTOR.
BY J. T. Dawling ATTORNEYS.

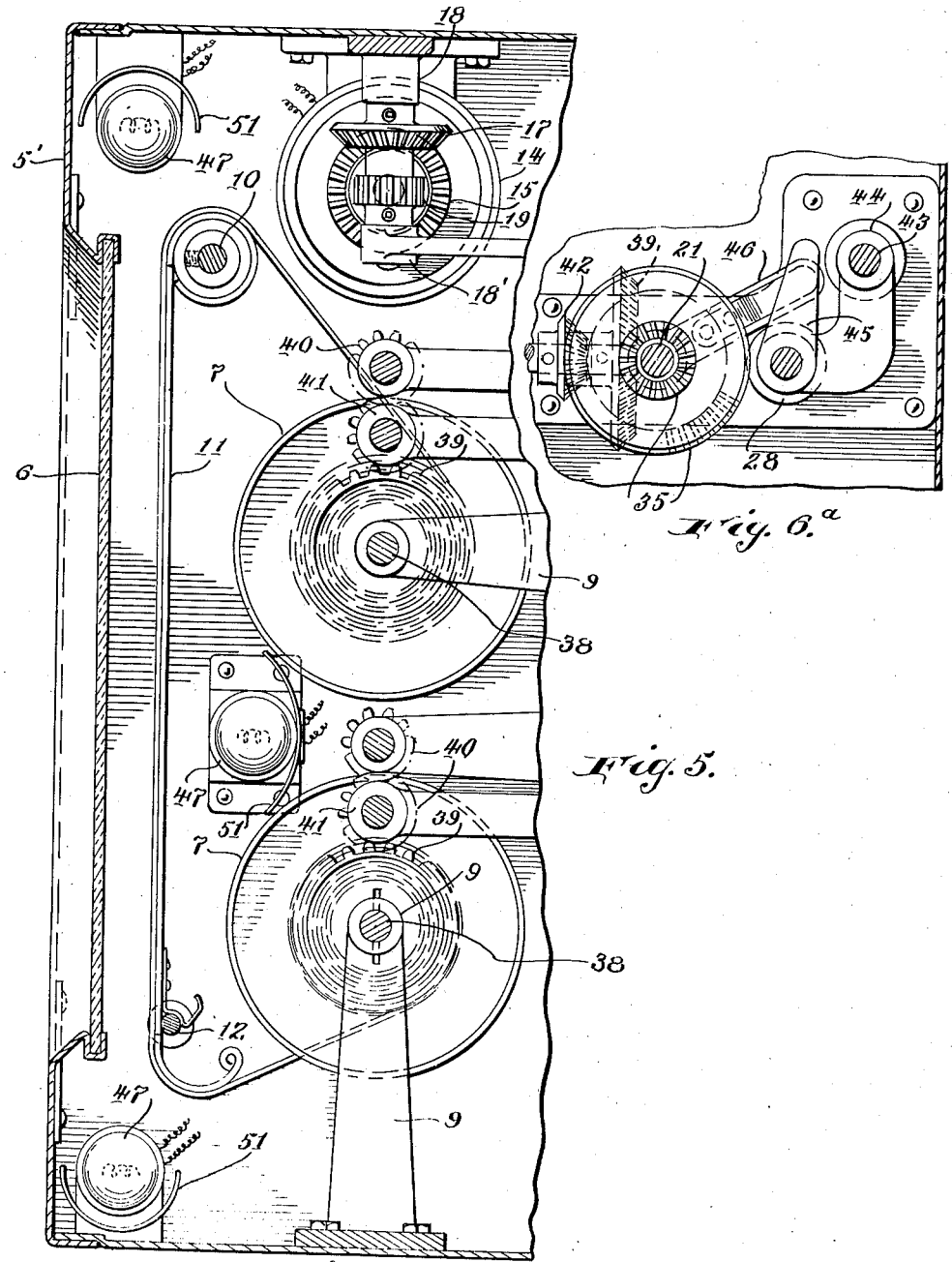

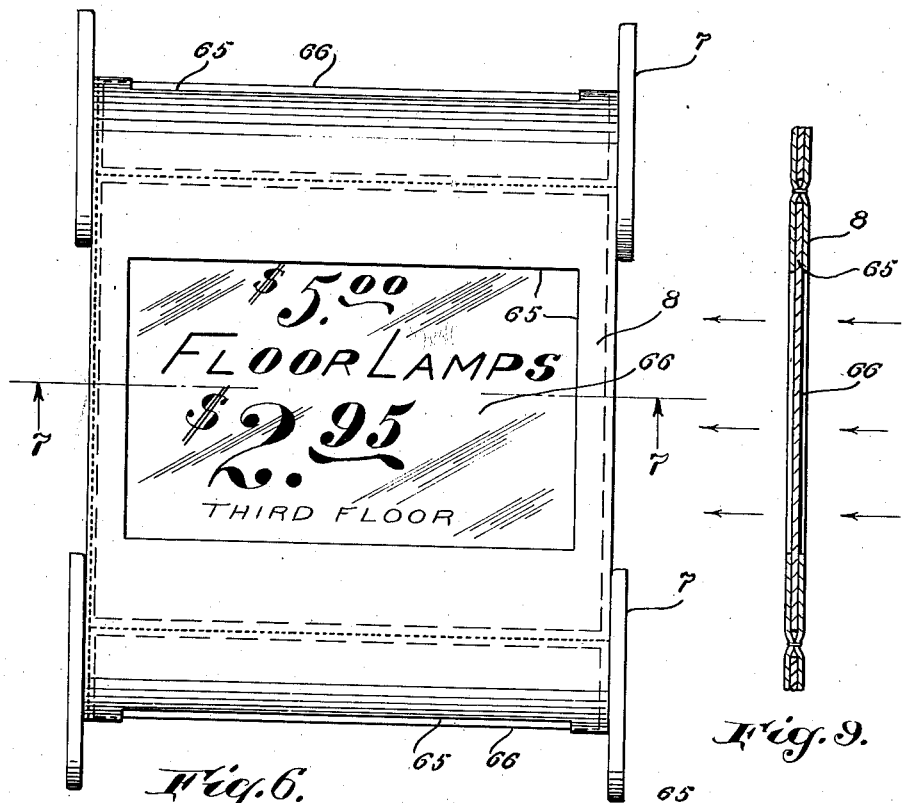
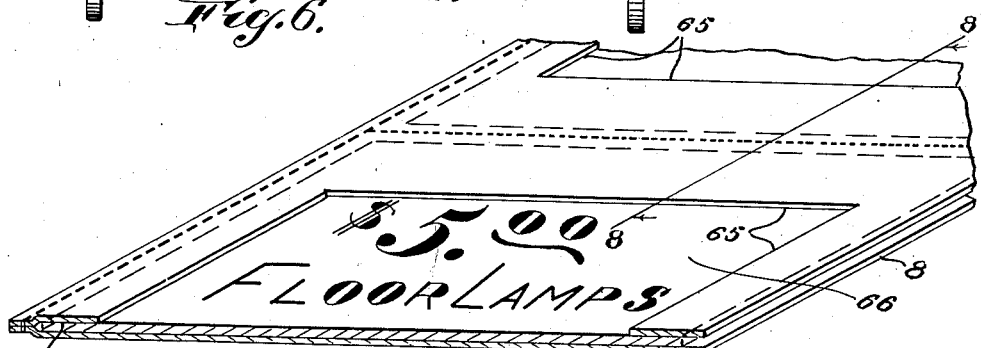

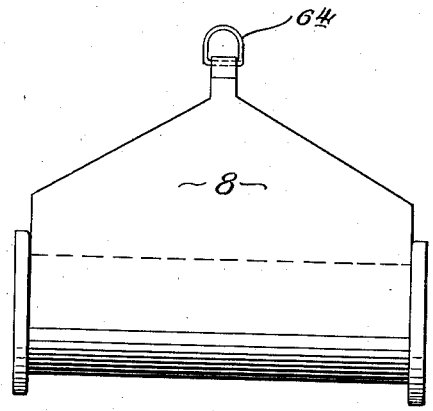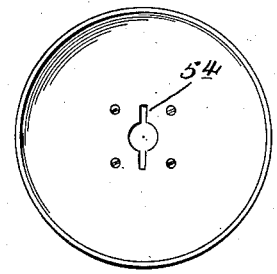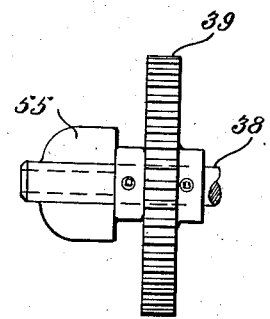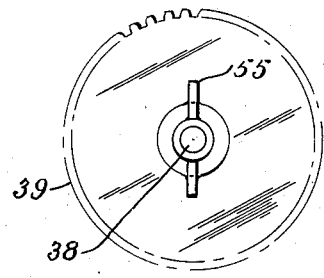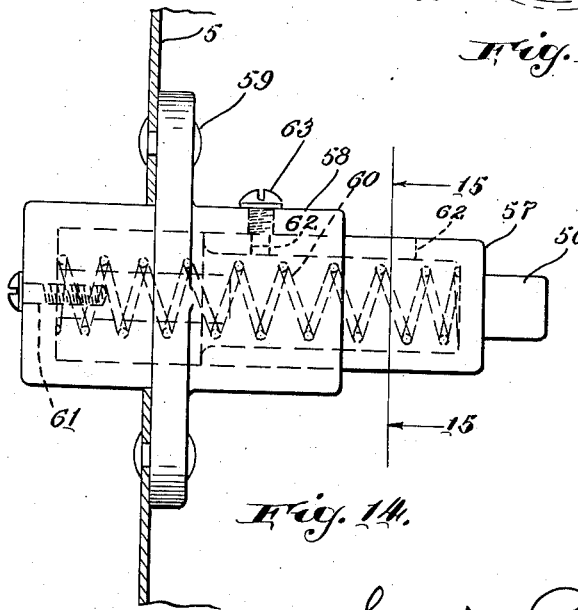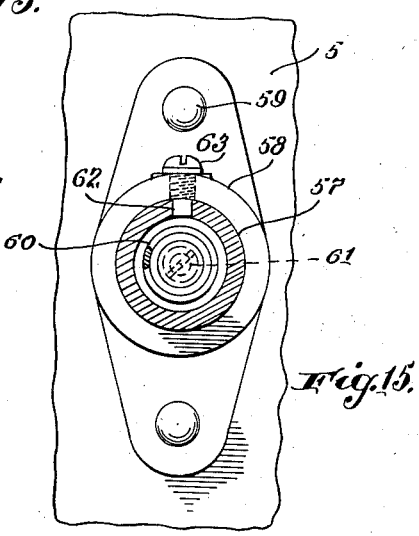

Patented Aug. 19, 1941

2,252,805

UNITED STATES PATENT OFFICE 2,252,805

CARRIER CONTROLLED EXHIBITOR

Jack Edward Gruden, Baltimore, Md.

Application February 24, 1939, Serial No. 258,206

3 Claims. (Cl. 40—93)

This invention relates to certain new and novel carrier controlled exhibitors to be used in combination with a carrier, particularly of the elevator type, whereby varied and various kinds of messages and symbols may be displayed in the exhibitor through the operation of the exhibitor and carrier.

A further and particular object of the invention relates to the means employed for rotating a display web to periodically change the display or advertising matter thereon, and to automatically reverse the movement of the web, all such movements taking place while the carrier is in motion.

With these and other objects in view, the invention consists of certain novel features, combination and arrangement of parts as will be hereinafter more fully described, pointed out in the accompanying drawings, and claimed.

In the drawings,

Figure 1 is a front elevational view of the exhibitor box, illustrating its operating mechanism in dotted lines;

Figure 2 is a fragmentary, transverse, sectional view, taken on the line 2—2 of Figure 1;

Figure 5 is a fragmentary, vertical, sectional view, taken on the line 5—5 of Figure 1;

Figure 6A is a fragmentary, transverse, sectional view, taken on the line 6A—6A of Figure 1;

Figure 6 is a front elevational view of the display webbing and rollers therefor;

Figure 7 is a fragmentary, perspective view of a construction of the webbing;

Figure 8 is a fragmentary, transverse, sectional view, taken on the line 8—8 of Figure 7;

Figure 9 is a fragmentary, vertical, sectional view of the webbing, illustrating the manner in which the changeable signs or messages are carried thereby;

Figure 10 is a front elevational view of a completely wound spool;

Figure 11 is an end elevational view of the spool;

Figure 12 is a fragmentary, end view of the spool having its gear attached thereto;

Figure 13 is an end elevational view of the end of the spool remote from Figure 11;

Figure 14 is a fragmentary, front elevational view, illustrating the manner of mounting the spool in the exhibitor frame;

Figure 15 is a vertical, sectional view, taken on the line 15—15 of Figure 14.

Figure 3:
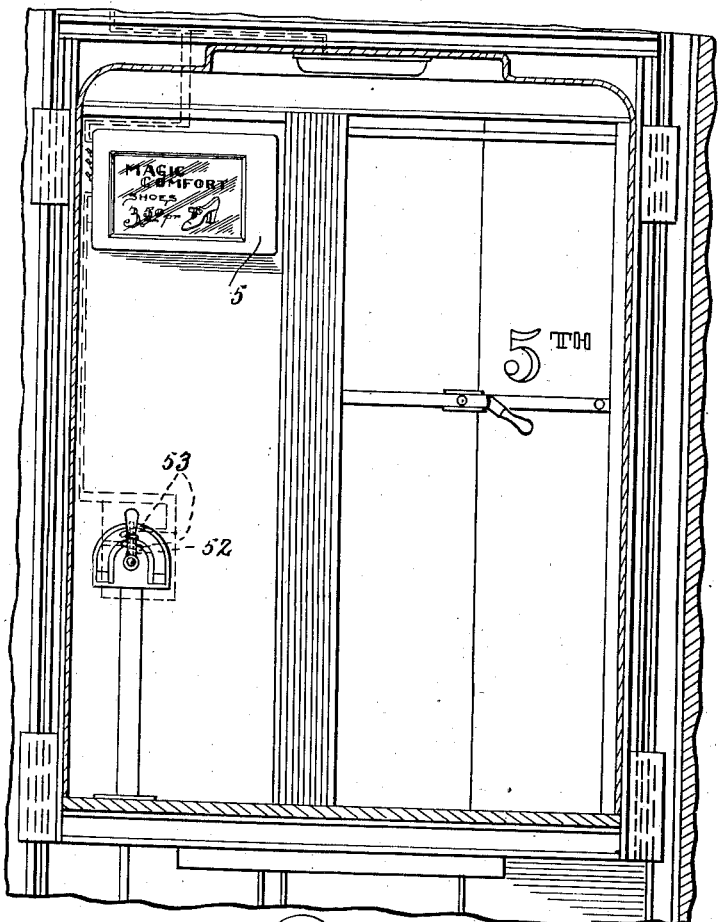
Figure 3 is a fragmentary, sectional view, illustrating the exhibitor attached to and associated with an elevator.
Figure 4:
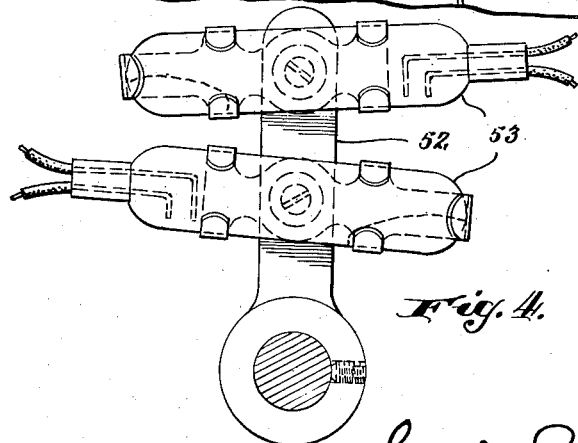
Figure 4 is an enlarged, elevational view of the mercury switches on the control lever of the elevator.

It is the aim of the present invention to utilize an elevator of the passenger type for advertising purposes by providing a medium wherein various messages and symbols may be displayed and varied during the movement of the elevator without materially increasing the cost thereof. The present invention therefore inculcates a casing having a changeable exhibitor mounted therein, equipped with a motor associated with the control of the elevator whereby upon movement of the elevator, either up or down, the changeable exhibitor will be operated to display varied and various messages and symbols to the occupants of the elevator.

To accomplish the above, I provide a changeable exhibitor mounted in and associated with an elevator or carrier cage in such a manner that various and varied messages or symbols may be displayed to the occupants of the cage during the movement thereof.

The exhibitor comprises in its construction a casing 5, which has a hinged front wall 5' which can be opened to permit access to the interior thereof. The front wall 5' is provided with an opening in which is secured a glass panel 6, behind which is mounted a pair of spaced rollers 7 having movable thereon a webbing 8. The rollers 7 are journaled in suitable supporting brackets 9 secured within the casing 5, as illustrated in Figure 5.

To support the webbing 8 in relative, expanded position behind the panel 6, the said webbing is trained over a support 10 having depending therefrom a platen 11, pivoted by one end to the support 10 and its free end removably fastened to a holding bar 12 mounted in the casing 5. The platen 11 in conjunction with the support 10 and bar 12 tends to keep the webbing in proper alignment with the panel 6, so that a positive display of a portion of what is depicted or carried on said webbing is within vision at all times.

It can be readily seen that by opening the front wall 5' and swinging the platen 11 outwardly the webbing can be easily removed from the support 10 and bar 12, so that the rollers may be changed or removed at the will of the operator.

To operate this webbing from one roller to the other and to provide for a continuous clock and counter-clockwise movement of said webbing, the rollers are provided with gears which intermesh with other gears and pinions and then in turn with the motor, which is associated in a circuit with the control lever of the carrier, whereby, when said lever is operated for movement of the carrier, the webbing is immediately placed in motion through the train of gearing just disclosed. The method and connection of said gearing will be hereinafter more fully described.

Supported within the casing 5 is a motor 14 having a drive gear 15 thereon, which meshes with a bevel gear 16 carried by a shaft 17 mounted in bearings 18 fixed in the casing 5, as at 18'. Fastened to the shaft 17, below the bevel gear 16, is a pinion spur gear 19, which meshes with a larger gear 20 mounted on a vertically movable shaft 21. The shaft 21 has its opposite ends mounted in bearing brackets 22 located at the top and bottom of the casing 5, and said shaft is adapted to have a slight vertical movement, the purpose of which will be hereinafter more fully described.

The bearing brackets 22 receive the ends of the shaft 21 therein, and each bearing bracket is provided with a spring pin 23 which engages in its respective seat 24 formed in the opposite ends of the shaft 21 to hold said shaft in either of its vertical positions.

A pair of gears 25 is secured to the shaft 21 slightly below the large spur gear 20 and these gears 25 are arranged to mesh with either spur gear 26' or 27' each of which is connected with bevel gears 26 and 27, respectively, carried by a worm shaft 28 mounted vertically in brackets 28' secured in the casing 5.

The gears 26 and 27, respectively, are in constant engagement with a gear 29 located between their faces and held in such engagement by a bearing 30 mounted in the casing, as at 31.

The unit gear comprising the spur gear 26' and bevel gear 26 is fixed to the worm shaft, as at 32, while the unit gear comprising the spur gear 27' and the bevel gear 27 is loosely mounted thereon by virtue of the collar attachment 33.

Mounted on the shaft 21, beneath the pinion gears 25, is a bevel gear 34 and centrally of said shaft is secured a combined gear and pinion gear 35, while at the lower end is another pinion gear 36, and these gears and shaft form the major train of gears for imparting rotational motion to the rollers 7, by virtue of energizing the motor 14.

Supported within the casing in alignment with the inner ends of the rollers 7, are bearings 37, in which are mounted shafts 38 and on each shaft 38 is a pair of spaced gears 39, the outermost gear of each shaft engaging the pinion gears 35 and 36, respectively, while the inner gears 39 engage a train of spur gears 40 mounted in bearings 41 in the casing 5, as clearly shown in Figure 1.

Each of the train of gears 40 is provided with a pinion gear 42, which engages the gears 34 and 35, respectively, when the shaft 21 is moved vertically in one direction to assure the operation of the webbing on the rollers 7. To reverse this operation it is only necessary to move the vertical shaft 21 opposite to the direction in which it was previously moved.

Secured within the casing 5 is a guide shaft 43 having slidably mounted thereon a sleeve 44 and fixed to which sleeve is a threaded boss 45, which boss threadedly engages the worm shaft 28 for upward and downward movement thereon, depending upon the direction of rotation of said worm shaft. The boss 45, in its movement up and down the worm shaft, is adapted to engage tripper bars 46 adjacent the upper and lower ends thereof, these trippers extending laterally towards the worm shaft 28 for positive engagement with the boss 45, which is movable on said worm shaft for the purpose of raising or lowering the drive shaft 21 to change the gear train, which change of gear train affects the relative rotation of the webbing in either clock or counter-clockwise direction.

To arrange for illuminating the casing and glass panel thereof, there is arranged within the casing at the top, center and bottom thereof, lighting means 47, having suitable wires running to a switch box 48 located in the casing, wires extending from the switch box to the motor 14 and said motor and lights connected by switches 49 located in the switch box and in circuit with power lines 50 extending into said switch box and in circuit with said switches, lines and motor, as clearly shown in Figure 1.

It is easily understood that by manipulation of the switches 49, the lights and motor will be energized for the purpose of controlling the movement of the webbing and the lighting of the lights.

The lights are shielded by reflectors 51, which partially surround the light source and direct the rays emanating therefrom towards and through the glass panel 6.

A portion of said power lines 50 extends downwardly through the box to the control lever 52 of the carrier or elevator cage, which lever is provided with mercury switches 53 so that when said lever is moved the switches 53 move into action and this energizes motor 14 and sets the train of gearing into motion to operate the webbing during the movement of the cage and when said cage is brought to a stop by the operation of the control lever, the mercury switches immediately operate to stop the motor, which in turn stops the movement of the webbing.

Figure 16:
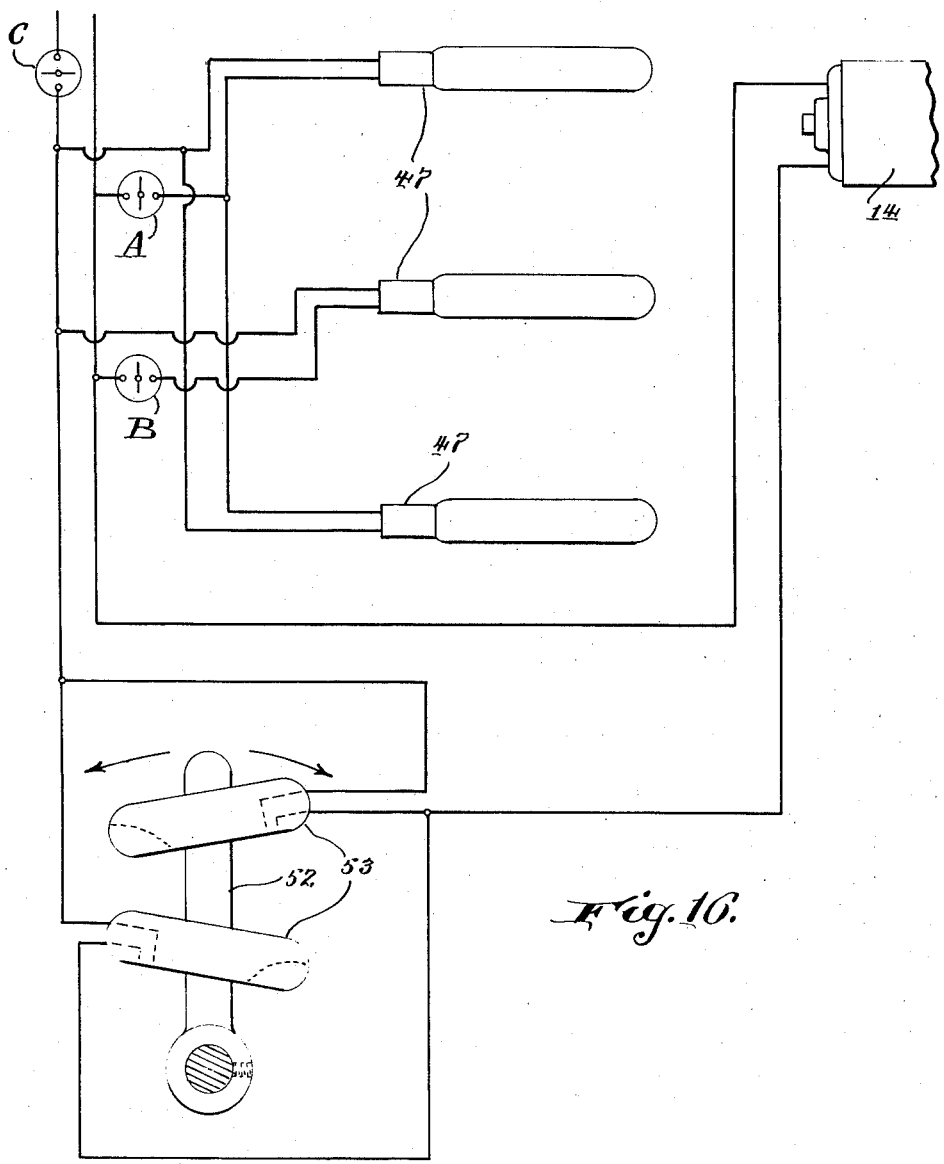
Figure 16 is a diagrammatic view of the wiring used in connection with the carrier for control of the changeable exhibitor.

Figure 16 illustrates a diagrammatic view of the wiring plan and shows wires running from power lines 50 to switches 49, which are also alphabetically designated as "A," "B," and "C," from the switches to the lights, motor, and control lever. Also in circuit therewith, are the mercury switches 53, which complete the operation above described.

It is to be distinctly understood that the inventor is not to be limited to any particular type of switches, or gearing, or arrangement thereof, as any form or train of gearing or switches may be used, so long as there is a continuous display from an exhibitor during the movement of a carrier or elevator cage.

The rollers 7 are positioned within the casing and are arranged to have one of their ends in direct alignment with the shafts 38. The central portions of these rollers 7 adjacent the ends of the stub shafts 38 are provided with keyway slots 54 to receive a key 55 mounted on the opposing ends of the shafts 38 so that upon movement of the shafts 38 rotational motion will be imparted to the rollers 7.

To properly retain the rollers 7 in alignment with the shafts 38, the opposite ends thereof are provided with openings to receive the reduced bearing 56 formed on a plunger rod 57 telescopically mounted in a housing 58 secured to the wall of the casing 5, as at 59. The plunger 57 is resiliently held in the housing 58 by virtue of a spring 60 mounted within the housing and engaging the plunger, said spring being held in transverse alignment by a fastener 61.

To permit of longitudinal telescopic movement of the plunger 57 in the housing 58, the wall of the housing is provided with a slot 62 in which is fitted the inner end of a fastener 63 extending through the wall of the housing 58.

It can be readily seen that the rollers, when mounted between the plunger of the housing and the gear shafts 38, will be resiliently held in position at all times during the operation thereof, and to facilitate the removability of these rollers it will only be necessary after the casing is opened to depress the plunger 57 and slip the rollers from the keys 55 of the shafts 38.

The webbing 8 is fastened to the rollers in any particular manner, but is here shown as having its ends reduced and provided with a suitable fastening clip 64.

In the illustration in Figures 6 to 9, inclusive, the webbing 8 is herein shown as provided with pockets 65 to receive removable inserts 66, which inserts have depicted thereon certain messages or symbols to be displayed through the panel 6 when the webbing is operated over the rollers 7 by the manipulation of the train of gearing and motor.

It is to be understood that the inventor is not limited to the method or type of webbing used, the main and principal thought of the invention being the provision of a casing mounted in a carrier cage and associated with a control lever thereof, by virtue of a power source, switches, and motor, that a movable and ever changing exhibit will be displayed in the cage at a given point, which is always in line with the vision of the occupants thereof.

While the invention has been disclosed in this instance with reference to the adaptability for use in carrier cages, it may be adapted as well by the application of the same principle to various other uses, which, with various modifications and details of stucture, and arrangements, will readily occur to those skilled in the art.

I have thus described my invention in detail in order that its operation and structure may be fully understood; however, the terms herein are used in their descriptive sense only and not in a limiting manner, the scope of the invention being defined in the claims.

Having thus described my invention, what I claim as new is:

1. In a display device, a casing, a pair of vertically spaced web carrying rollers having horizontal axes, upper and lower roller driving shafts axially alined with said rollers, a vertically shiftable and rotatable vertical shaft journalled in said casing, a motor, gearing drivingly connecting said motor and vertical shaft for continuously driving said shaft in one direction upon operation of said motor, jack shafts for each of the upper and lower roller driving shafts and respectively geared to the latter, bevel gears on each jack shaft and each roller driving shaft, two pairs of bevel gears on said vertical shaft spaced to provide simultaneous engagement of one of each pair with a bevel gear on one jack shaft and one of the other pair with the bevel gear on the driving shaft geared to the other jack shaft, a worm shaft parallel to the vertical shaft, shifting means actuated by the worm shaft for vertically shifting the vertical shaft, and reversing gearing connecting the worm and vertical shafts and arranged to reverse the movement of the worm shaft upon completion of the movement of the shifting means in one direction.

2. The device of claim 1 wherein the reversing means for the worm shaft comprises a pair of gears on the worm shaft one of which is fixed to the worm shaft and the other revolves freely thereon, gearing causing said pair of gears to revolve in opposite directions, and gear means for selectively connecting the gears of the pair to said vertical shaft.

3. The device of claim 1 wherein means are provided for restraining the vertically movable shaft at each end of its movement.

JACK EDWARD GRUDEN.